March 3, 1942.  F. TVETEN  2,275,330
SKI STICK
Filed June 28, 1939

Inventor
Finn Tveten
By: Strand and Davis
Attys.

Patented Mar. 3, 1942

2,275,330

UNITED STATES PATENT OFFICE 2,275,330

SKI STICK

Finn Tveten, Oslo, Norway

Application June 28, 1939, Serial No. 281,715
In Norway June 29, 1938

3 Claims. (Cl. 280—11.37)

The present invention relates to ski-sticks consisting of two or more parts, for instance metal tubings, say aluminium or steel tubings, fixed together in a suitable manner, at least two of these parts being telescopically displaceable within each other in order to make a variation of the length of the sticks possible.

The invention has for its object to provide a device, by means of which the displaceable parts in a simple and trusty manner can be locked together in any desired position and also loosened from each other in a simple manner.

The main characteristic feature of the invention is, that the locking together of the displaceable parts is effected by means of a device operating in accordance with the wedge principle. Further features of the invention will appear from the following description of an embodiment of the device.

Figure 1:
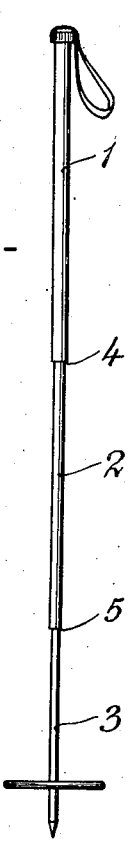
Figure 2:
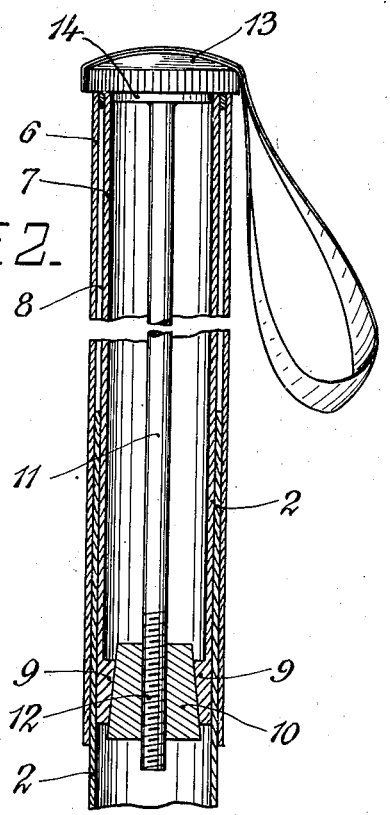
Figure 3:
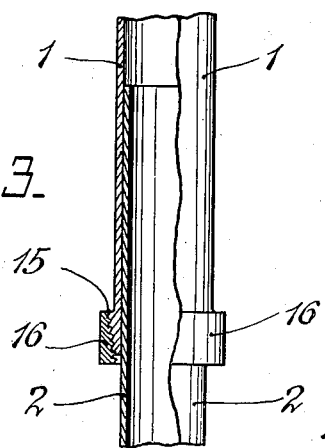

In order to describe clearly my invention I will refer to the accompanying diagrammatical drawing, wherein:

Figure 1 shows a ski-stick consisting of three pieces of tubing,

Figure 2 a longitudinal section through the two uppermost displaceable parts, in an enlarged scale, and Figure 3 a longitudinal section through another construction of the locking device.

According to Figure 1 the ski-stick may consist of three pieces of steel tubing 1, 2 and 3 placed inside each other at the joints 4 and 5. All the tubings are cylindrical, the uppermost tubing 1 having the largest diameter, while the diameters of the tubings 2 and 3 correspond to the inner diameters of the tubings 1 and 2 respectively. The tubings 2 and 3 are fixed together at the joint 5 for instance by means of welding or in another suitable manner.

In order to make it possible to lengthen and shorten the ski-stick so that the length of the same may suit anyone, the joint 4 is constructed in such a manner, that the tubing 2 can be displaced in relation to the tubing 1 and locked in the desired position by means of devices as described below.

A construction of the upper part of the ski-stick with the joint 4 is shown in Figure 2 in an enlarged scale. According to this construction the upper end of the ski-stick consists of two concentrical tubes 6 and 7 placed within each other with an interspace 8, in which the upper part of the tubing 2 is displaceably placed. The lower end of the tube 7 internally is provided with one or more inclined surfaces 9 intended to engage with a cone 10 axially placed in the ski-stick.

When said cone is moved axially upwards, the lower end of the tube 7 is expanded, whereby the tube 2 is pressed firmly between the tubes 6 and 7. One or more of the contacting tube-surfaces ought to be grooved or rough in order to make the friction in the joint 4 as great as possible. Furthermore the lower part of the tube 7 and eventually also the upper part of the tube 2 may be splitted in order to facilitate the expansion of the same when the cone 10 is moved upwards.

The mechanism for moving the cone 10 consists of an axial rod 11, the lower end of which is provided with threads 12 engaging with corresponding threads in an axial hole in the cone. The rod 11, extending to the top of the ski-stick, is provided with a suitably shaped head or the like 13, by means of which the rod can be turned. The edge of said head in usual manner is provided with grooves for increasing the friction against the hand when turning the rod. Further, the lower side of the head is provided with a guiding edge 14, fitting into the tube 7.

When the rod 11 is being turned in a certain direction, the cone 10, the turning of which is prevented by friction or by other suitable means not shown on the drawing, will be screwed upwards and thereby pressed against the inclined surfaces 9, so that the tube 7 owing to wedge-effect is expanded and thereby locking the tube 2 firmly to the outer tube 6. When the rod 11 is being turned in the opposite direction the cone will be screwed downwards, whereby the pressure against the inclined surfaces 9 is released. The tube 2 now may be moved axially and thereby the length of the ski-stick changed, whereafter the locking is effected by screwing the cone 10 upwards.

The inner tube 7 eventually may be dispensed with, in which case the inclined surface 9 is attached to the upper end of the tube 2. Such an arrangement, however, will not be so effective as the device above described.

Another construction of the locking device is shown in Figure 3. According to this construction, the lower end of the upper tubing 1 of the ski-stick is provided with external, conical threads 15 engaging with a suitably shaped nut 16 with corresponding conical threads. When this nut is being screwed upwards, the wall of the lower end of the tubing 1 owing to wedge-effect is pressed against the tubing 2, said two tubings thereby being locked together.

I wish it to be understood, that many different embodiments of my above described device are possible without departing from the scope of my invention as defined by the subjoined claims.

I claim:

1. A ski-stick having an adjustable shaft comprising at least two telescopically joined shaft segments, one of which is hollow and forms a handle, an expansible ring within the telescoped portions of the shaft segments, an adjustable wedge within said ring, means for supporting said wedge and controlling the adjustment thereof, and a cap closing the free end of the handle segment and connected with said wedge supporting and controlling means.

2. A ski-stick having an adjustable shaft comprising at least two telescopically joined shaft segments, one of which is hollow and forms a handle, a cap pivotally seated in the free end of said handle, a threaded rod extending axially within said handle and supported by said cap, an expansible ring positioned within the inner segment and adjacent the telescoped portions, and a wedge threaded upon said rod and positioned within said ring.

3. A ski-stick having an adjustable shaft comprising a handle including two radially spaced concentric tubes, a tubular shaft adapted to telescopically slide within the space between said concentric tubes, the inner end of the inner concentric tube comprising an expansible ring adapted to frictionally engage the inner walls of the overlying tubular shaft, a wedge for expanding said ring, said wedge being carried in threaded engagement by a rod extending axially through the handle, and a cap closing the free end of the handle and supporting said rod whereby the locking of the adjusted tubes may be effected by the cap.

FINN TVETEN.